Sept. 22, 1970 SHIH M. HO 3,530,209
METHOD FOR FORMING MAGNESIUM ALUMINATE SPINEL BODIES
Filed March 17, 1966 2 Sheets-Sheet 1

INVENTOR
Shih M. Ho
BY
W. D. Palmer
ATTORNEY

United States Patent Office 3,530,209
Patented Sept. 22, 1970

3,530,209
METHOD FOR FORMING MAGNESIUM ALUMINATE SPINEL BODIES
Shih M. Ho, Pittsburgh, Pa., assignor to Westinghouse Electric Corporation, Pittsburgh, Pa., a corporation of Pennsylvania
Filed Mar. 17, 1966, Ser. No. 535,202
Int. Cl. F27b 9/04, 9/10
U.S. Cl. 264—65            6 Claims

ABSTRACT OF THE DISCLOSURE

To form a magnesium aluminate spinel body having a density which closely approaches theoretical, a relatively high strength, and very good radiation transmission characteristics, there is first formed a compact of very finely divided spinel powder. The formed compact is then sintered under very high-pressure, high-temperature conditions to produce a sintered body having a very high density in addition to a very fine grain structure.

---

This invention relates to polycrystalline oxide bodies and, more particularly, to a method for forming magnesium-aluminate spinel bodies having a density which closely approaches theoretical, a relatively high strength, and very good radiation transmission characteristics.

Polycrystalline oxide materials are known for their excellent resistance to corrosive environments such as high-temperature alkali vapor and their high degree of transparency, as well as their ability to retain these properties at extremely high temperatures. Such bodies have particular application as arc-enclosing envelopes for very high temperature, alkali-vapor discharge devices, windows in nuclear reactor boilers, in furnaces, and high speed missiles.

Polycrystalline oxide bodies which are formed of alumina are known and are described in U.S. Pat. No. 3,026,210, dated Mar. 20, 1962. In U.S. Pat. No. 3,155,-534, dated Nov. 3, 1964, is described a method for making a magnesia-alumina spinel body.

Spinel bodies have a higher melting temperature and better alkali resistance than polycrystalline alumina bodies and for this reason should be more suitable than the polycrystalline alumina for many applications. Troubles have been encountered in providing the spinel bodies with adequate strength characteristics and this has limited the use of such material.

It is the general object of this invention to provide a method for forming a magnesium-aluminate spinel body having a density which closely approaches theoretical, a relatively high strength, and very good radiation transmission characteristics.

It is another object to provide a method for making a relatively high strength magnesium-aluminate spinel body which can be used in applications where the bodies are to be exposed to very high temperature, alkali-metal vapors, such as the arc tubes for vapor lamps.

The foregoing objects of the invention, and other objects which will become apparent as the description proceeds, are achieved by providing an improved method for forming magnesium-aluminate spinel bodies wherein there is first formed a compact of very finely divided, ultrapure spinel powder. This formed compact is placed into a hot-pressing mold and there is applied to the mold-retained compact a pressure of from 4500 p.s.i. to 10,000 p.s.i., while simultaneously heating the same to a temperature of from 1450° C. to 1750° C. The simultaneously applied pressure and temperature are maintained from seven minutes to 360 minutes, with the higher the heating temperature the shorter the heating time to limit the average size of the grains of the formed body to less than fifty microns.

For a better understanding of the invention, reference should be had to the accompanying drawings wherein.

The present spinel bodies are formed from very finely divided, ultrapure spinel powder which preferably has an average particle size or a diameter less than about one micron. Such spinel powder can be readily prepared by mixing C.P. magnesium nitrate $Mg(NO_3)_2 \cdot 6H_2O$ and very finely divided $\alpha$-aluminum oxide powder in equimolar proportions. The particular alumina powder which was used had an average particle size of about 0.3 micron. In making the mixture, one mole of magnesium nitrate is dissolved in 200 milliliters of distilled water and to this solution is gradually added the very fine aluminum oxide powder while stirring the solution. After all of the alumina powder is added, the liquid is rapidly mixed for another twenty minutes in order to obtain a homogeneous mixture. The mixture is then fired in an air atmosphere at a temperature of 100° C. for two hours in order to remove all moisture. The resulting dried material is fired at a temperature of 300° C. for two hours to remove the crystalline water. The dry material is fired at a temperature of 600° C. for four hours to remove all of any nitrogen oxides which may be present. The material is then fired at 1400° C. for four hours in order to react the magnesia and alumina to form a spinel powder. The resulting spinel powder is snow-white and is further ground in an agate mortar to a fineness sufficient to pass a 230 mesh. All of the formed powder is spinel and it has average grain size less than about one micron.

Before pressure sintering, the very finely divided powder is cold-pressed, preferably at a pressure of at least 10,000 p.s.i., in order to form a compact. As an example, thirty grams of the spinel powder is cold-pressed in a one-inch diameter steel mold at a compacting pressure of 12,000 p.s.i.

Figure 1:
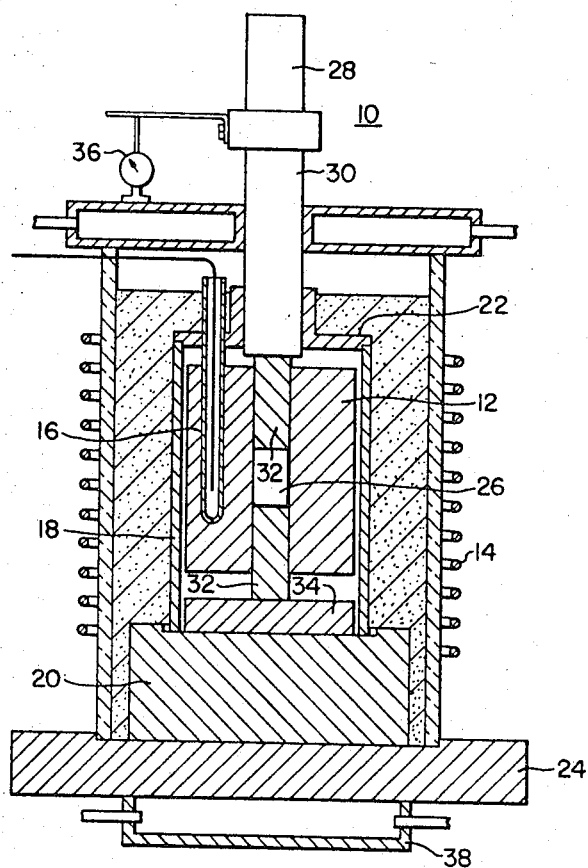
FIG. 1 is a generally diagrammatic view, shown partly in section, illustrating an apparatus which can be used for hot-pressing the present spinel bodies.

The resulting compact is loaded into a hot-pressing unit 10 as shown in FIG. 1. Briefly, this unit comprises a graphite cylindrical mold 12 which is adapted to be heated by an induction coil 14, with the heating temperature measured by a thermocouple 16. The graphite mold 12 is retained in position by a surrounding graphite sleeve 18, which in turn is retained at the bottom by a carbon cylinder 20 and at the top by a carbon cap 22. The unit 10 rests upon a fixed platen 24 and pressure is applied to the compact 26 by means of a high temperature alloy plunger 28 which is connected to a graphite plunger 30. Graphite members 32, which are slidable in the graphite cylinder 12, press against the ends of the compact 26. The upper one of members 32 is contacted by the plunger 30 and the lower one of members 32 rests on a graphite cylinder 34. The pressure is applied by a conventional overhung hydraulic press (not shown). The compression is registered by a dial indicator 36 and water-cooled heads 38 are provided at the ends of the passing unit 10.

Figure 2:
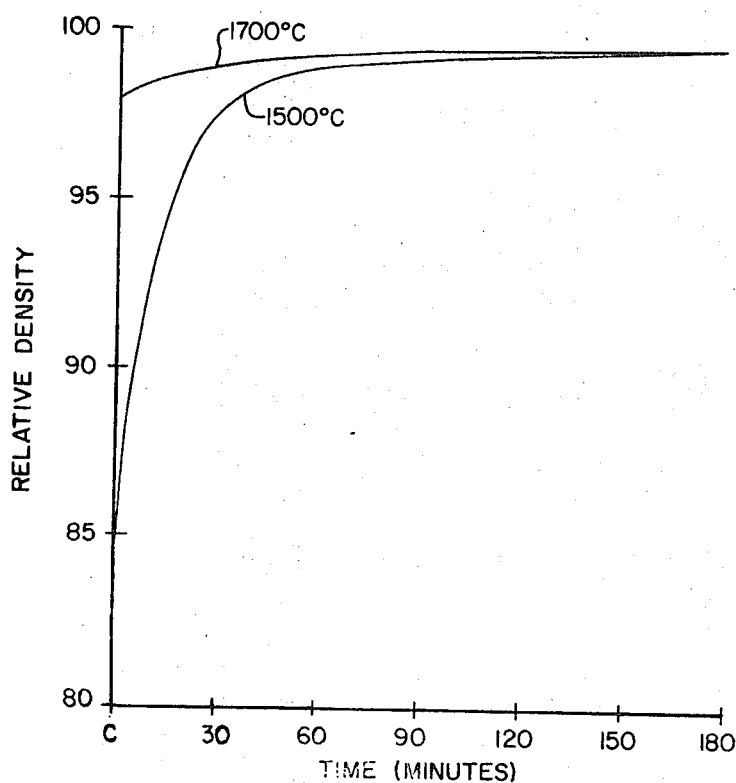
FIG. 2 is a graph of relative density versus time showing the density-time relationships for hot-pressing spinel bodies at two different temperatures with an applied pressure of 5000 p.s.i.

FIG. 2 illustrates two curves of density versus time for hot-pressed spinel wherein the applied pressure was 5000 p.s.i. With a pressing, sintering temperature of 1500° C., as shown in the lower curve in FIG. 2, the increase in densification of the compact occurs at a relatively slow rate. With a pressing, sintering temperature of 1700° C., as shown in the upper curve in FIG. 2, the increase in densification of the compact occurs at a much faster rate. Since it is desired to achieve a density which approximates the theoretical density of spinel, it would appear desirable to utilize a much higher pressing temperature. This is not the case, however, because of the rapid grain growth which occurs during the hot pressing as the temperature is increased. In explanation, when the compact is hot pressed at a temperature greater than 1750° C., the grain growth in the compact increases at a very fast rate, resulting in relatively large grains and discontinuous grain growth. Both large grains and discontinuous grain growth result in a relatively weak structural material, and to obtain a strong structural material, the maximum average grain size should not exceed fifty microns.

Temperature is the dominant variable influencing the average grain size. The maximum permissible pressing temperature is 1750° C. At this temperature, the pressing time should not exceed 180 minutes, or the resulting grains will be excessively large. In order to achieve an adequate densification at the maximum pressing temperature of 1750° C., the pressing time should be at least seven minutes.

In order to obtain an adequate densification of the compact, the pressing temperature should be at least 1450° C., and this minimum pressing temperature should be maintained for from eighty minutes to 360 minutes. The preferred heating temperature is from 1500° C. to 1700° C. with a pressing time of from ten minutes to 240 minutes, with the higher the pressing temperature, the shorter the pressing time and vice versa. Very good results are obtained with a pressing temperature of 1700° C., maintained for from ten minutes to 180 minutes.

The minimum pressure used during the hot pressing is 4500 p.s.i., if an adequate density is to be achieved. The maximum pressure is 10,000 p.s.i. The preferred pressure during the hot pressing of the compact is 5000 p.s.i.

Figure 3:
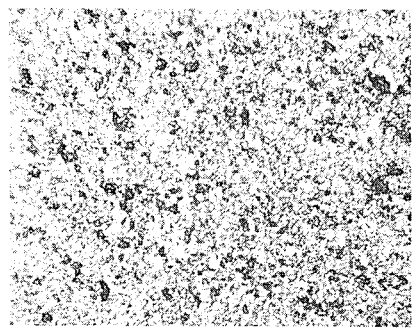
FIG. 3 is a photomicrograph (200×) showing the effect of sintering time on grain growth when the compact is sintered for 10 minutes at a temperature of 1700° C. and a pressure of 5000 p.s.i.
Figure 4:
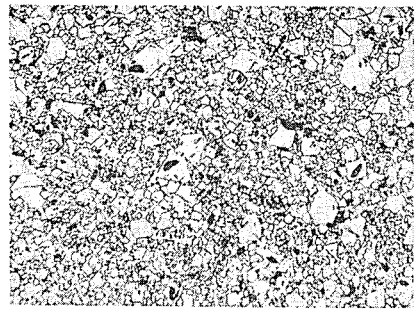
FIG. 4 is a photomicrograph similar to FIG. 3 except that the sintering time is 120 minutes.

In FIG. 3 is shown a photomicrograph (200×) for a sintered body prepared with a pressure of 5000 p.s.i. and a temperature of 1700° C. maintained for ten minutes. The microstructure of the resulting material is extremely fine with the average grain size being about five microns, with a bimodla grain structure. A similar body was pressed for 120 minutes under similar conditions and a photomicrograph of the resulting material is shown in FIG. 4, wherein the average grain size is about thirteen microns.

Figure 5:
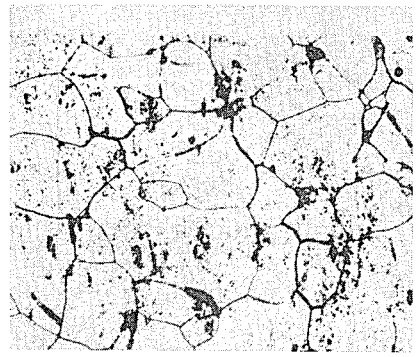
FIG. 5 is a photomicrograph similar to FIG. 3 except that the sintering temperature is at 1800° C. and the sintering time is 120 minutes.

If a pressing temperature of approximately 1800° C. is maintained for a period of two hours at the same pressure of 5000 p.s.i., the grain growth will be excessive and, in addition, there will be discontinuous grain growth with many different sizes of grains. This results in a structurally weak material. A photomicrograph of such prepared material is shown in FIG. 5, and the average grain size is about sixty microns.

After pressing the manner as described hereinbefore, the resulting spinel body may have a gray appearance. To eliminate this, the prepared bodies are fired in an atmosphere comprising oxygen at a temperature of at least about 1200° C. for a sufficient time to cause the bodies to become milkish white in appearance. As a specific example, a firing temperature of 1400° C. for four hours in oxygen will normally be sufficient.

For a spinel body formed with a pressure of 5000 p.s.i. and a temperature of 1700° C. maintained for ten minutes, the flexural strength is 33,000 p.s.i. at room temperature, and the high-temperature strength of the material is also quite good. A 2.08 mm. spinel body prepared by pressing at 5000 p.s.i. and 1700° C. for 180 minutes has an in-line transmission for visible radiations which varies from 2% to 16% and the in-line transmission of infrared radiations having a wavelength of 4.5 microns is about 84%. This is considerably better than the corresponding transmission for polycrystalline alumina. The following Table I lists some of the transmission values at various wavelengths.

Table I

| Wavelength (microns): | Percent in-line transmissivity |
|---|---|
| 0.4 | 2.0 |
| 0.5 | 8.0 |
| 0.6 | 16.0 |
| 1.0 | 55.0 |
| 2.0 | 75.0 |
| 3.0 | 79.0 |
| 4.0 | 82.0 |
| 4.5 | 84.0 |
| 5.0 | 80.0 |
| 5.5 | 66.0 |
| 6.0 | 32.0 |
| 7.0 | 1.0 |

The formed material has a density which approaches theoretical and densities up to 3.5900 gms./cm.$^3$ have been obtained. The material is extremely stable chemically and does not react with molten caustic, alkalies or alkali carbonates.

It will be recognized that the objects of the invention have been achieved by providing an improved method for forming magnesium-aluminate spinel bodies which have a density which closely approaches theoretical, a relatively high strength, and very good radiation transmission characteristics.

While preferred embodiments of the invention have been illustrated and described in detail, it is to be particularly understood that the invention is not limited thereto or thereby.

I claim:

1. The method of forming a magnesium aluminate spinel body having a density which closely approaches theoretical, a relatively high strength, and very good radiation transmission characteristics, which method comprises:
    (a) forming a compact of very finely divided ultrapure spinel powder;
    (b) placing the formed compact into a hot pressing mold;
    (c) applying a pressure of from 4500 p.s.i. to 10,000 p.s.i. to the mold-retained compact while simultaneously heating same to a temperature of from 1450° C. to 1750° C.; and
    (d) continuing the heating and pressing of the mold-retained compact for a total period of from 7 minutes to 360 minutes, with the higher the heating temperature the shorter the heating period to limit the average grain size of the resulting formed body to less than 50 microns, and the lower the heating temperature the longer the period to achieve a density in the formed body which closely approaches theoretical.

2. The method as specified in claim 1, wherein said compact is formed from spinel powder having an average particle diameter of less than about one micron, and said compact is formed from said powder with a cold-compaction pressure of at least about 10,000 p.s.i.

3. The method as specified in claim 1, wherein the heating and pressing period varies from 7 minutes to 180 minutes at the maximum heating temperature of 1750° C. to from 80 minutes to 360 minutes at the minimum heating temperature of 1450° C.

4. The method as specified in claim 1, wherein said hot-pressing pressure is about 5000 p.s.i., said hot-pressing temperature is from 1500° C. to 1700° C., and said hot-pressing period is from 10 minutes to 240 minutes, with the higher the hot-pressing temperature, the shorter the period.

5. The method as specified in claim 1, wherein said hot-pressing pressure is about 5000 p.s.i., said hot-pressing temperature is about 1700° C., and said period is from 10 minutes to 180 minutes.

6. The method as specified in claim 1, wherein after formation, said spinel body is heated in an atmosphere comprising oxygen at a temperature of at least 1200° C. for a sufficient time to cause said spinel body to have a white color.

References Cited
UNITED STATES PATENTS

| | | | |
|---|---|---|---|
| 2,280,517 | 4/1942 | Ridgway | 106—62 |
| 3,030,228 | 4/1962 | Hernandez | 264—65 |
| 3,285,761 | 11/1966 | Hare et al. | 106—62 |
| 3,304,153 | 2/1967 | Bakker | 106—62 |
| 3,333,971 | 8/1967 | McKenna | 106—62 |

DONALD J. ARNOLD, Primary Examiner

U.S. Cl. X.R.

23—52; 106—62; 264—66